F. C. PAHLOW.
PIPE COUPLING.
APPLICATION FILED MAY 22, 1908.
939,539.
Patented Nov. 9, 1909.
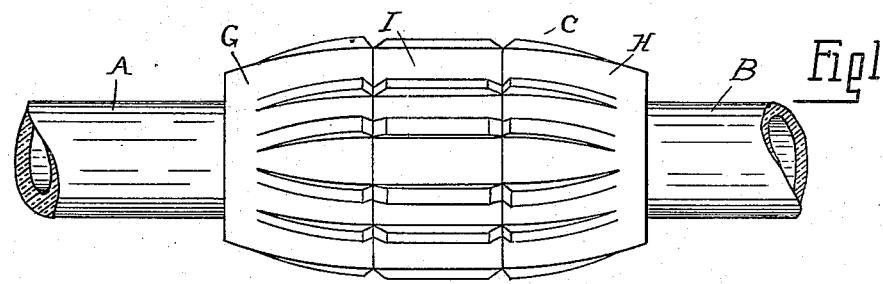
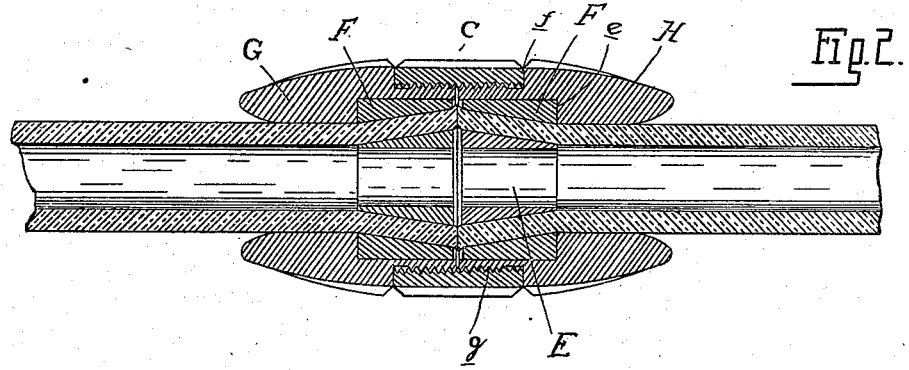
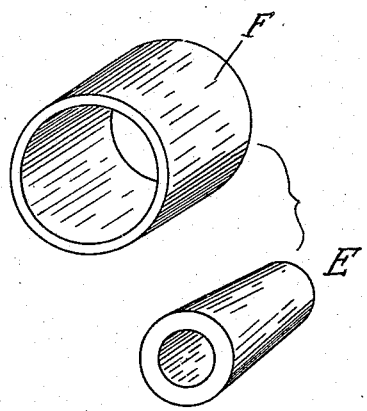
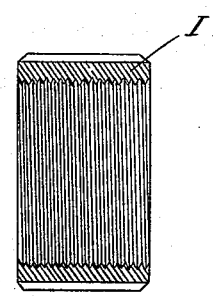
Witnesses
Inventor
Frank C. Pahlow
By Whittemore, Hulbert & Whittemore
attys ated section of the coup-
UNITED STATES PATENT OFFICE.

FRANK C. PAHLOW, OF DETROIT, MICHIGAN, ASSIGNOR OF ONE-HALF TO ANTONIO C. PESSANO, OF DETROIT, MICHIGAN.

PIPE-COUPLING.

939,539.      Specification of Letters Patent.      Patented Nov. 9, 1909.

Application filed May 22, 1908. Serial No. 434,307.

*To all whom it may concern:*

Be it known that I, FRANK C. PAHLOW, a citizen of the United States of America, residing at Detroit, in the county of Wayne and State of Michigan, have invented certain new and useful Improvements in Pipe-Couplings, of which the following is a specification, reference being had therein to the accompanying drawings.

The invention relates generally to a pipe coupling, especially designed for use in the present instance for connecting adjoining lengths of flexible piping, such as a hose, and the invention consists primarily in the novel construction of a coupling of this character wherein the pipe lengths may be more rapidly and effectively connected than heretofore, and it consists further in the peculiar arrangement and combination of the various parts of the coupling as will be hereinafter set forth.

In the drawings illustrating the invention,—Figure 1 is a view in elevation of my improved coupling; Fig. 2 is a vertical central section through the coupling, showing the same applied to the pipe lengths to be joined; Fig. 3 is a perspective view of the tubular clamp, the parts being detached; and Fig. 4 is a detached sectional view of the sleeve.

In the drawings thus briefly described, A and B represent sections of the hose to be coupled together, and C is the coupling therefor.

In construction, the coupling comprises complementary tubular clamps, adapted to be applied to the meeting ends of the pipe or hose. Each clamp is composed of a tapered thimble, as E, and a correspondingly-tapered wedge ring F, the rings having smooth cylindrical outer surfaces forming bearings for the coupling members G and H. The latter members are preferably in the form of tubular nuts, and are mounted upon the wedge rings of the clamps for free rotary and sliding movement. Each nut is formed with a shoulder *e*, which abuts against the rear end of its respective wedge ring, and at its forward or meeting end with a reduced section *f*, externally threaded, as at *g*, the threads upon the adjoining portions of the coupling members being pitched in the same direction for a purpose hereinafter set forth.

I represents a coupling sleeve, internally screw-threaded and engaging the reduced and externally threaded section of the coupling nuts H and G.

In applying the coupling, the coupling nuts and wedge rings of the clamps are first applied to the hose ends in the order described, one of the nuts carrying the coupling sleeve thereon. The thimble sections of the clamps are then inserted within the meeting ends of the hose, preferably in such manner as to leave the extreme ends of the hose sections projecting therebeyond. The clamps are then applied by forcing the wedge rings upon the thimble sections, and the coupling members brought together to permit of their engagement by the coupling sleeve. Upon turning the coupling members in opposite directions, the desired coupling is effected.

It will be observed from the particular arrangement of the threads that in the operation of coupling the sleeve is practically stationary, while the coupling nuts turn in opposite directions, this movement permitting the coupling to be effected without twisting the hose or pipe lengths. Further, the smooth cylindrical surfaces of the wedge rings afford smooth bearings upon which the coupling members may rotate or slide, thus permitting the easy manipulation of the members during the operation of coupling. Finally, the projecting portions of the hose beyond the clamps form in connection with one another a gasket between the parts, thus making a tight and efficient joint.

What I claim as my invention is,—

1. In a coupling, the combination with adjoining sections of hose, of tubular clamps applied to the hose ends leaving meeting portions of the hose between the clamps, each of said clamps consisting of a tapering thimble and a correspondingly tapered wedge ring encircling said hose, tubular coupling nuts swiveled upon said rings, each of said nuts having a reduced externally threaded inner end and the outer end being fashioned to form a hand grip, and an internally threaded coupling sleeve engaging the reduced threaded sections of the coupling members.

2. In a coupling, the combination with adjoining sections of hose, of tubular clamps applied to the hose ends, leaving meeting portions of the hose between the clamps, each of said clamps consisting of a tapering thimble within the hose end, a correspondingly tapered wedge ring encircling said hose and having a smooth cylindrical outer surface, tubular coupling nuts swiveled upon said rings, each of said coupling nuts being formed with a shoulder abutting against the rear end of its respective ring and having a reduced externally threaded inner end and the outer end fashioned to form a hand grip, the threads of both of said nuts being pitched in the same direction, and an internally threaded coupling sleeve engaging the reduced threaded sections of the coupling members, said coupling nuts and said sleeve being so shaped and arranged that the outer surfaces longitudinally of said members form a substantially uniform curved surface.

3. In a coupling, the combination with adjoining sections of hose, of tubular clamps applied to the hose ends leaving meeting portions of the hose between the clamps, each of said clamps consisting of a tapering thimble and a correspondingly tapered wedge ring encircling said hose, tubular coupling nuts swiveled upon said rings, each of said nuts being formed with a shoulder abutting against the rear end of its respective ring and having an externally threaded inner end and the outer end being fashioned to form a hand grip, the threads on both of said nuts being pitched in the same direction, and an internally threaded coupling sleeve engaging the externally threaded portions of the coupling members.

4. In a coupling, the combination with adjoining sections of a hose, clamps applied to the hose ends leaving meeting portions of the hose between the clamps, each of said clamps consisting of a thimble and a corresponding wedge ring encircling said hose, coupling nuts swiveled upon said rings, each provided with a shoulder abutting against the rear end of its respective ring and having an externally threaded inner end, the threads on both of said nuts being pitched in the same direction, and an internally threaded coupling sleeve engaging the external threaded portions of the coupling members.

5. In a coupling, the combination with adjoining sections of hose, of tubular clamping nuts applied to the hose ends, leaving meeting portions of the hose between the clamps, each of said clamps consisting of a tapering thimble within the hose end, and a corresponding tapered wedge ring encircling said hose and having a smooth cylindrical outer surface, tubular coupling nuts swiveled upon said wedge rings, each having a recessed inner face engaging its respective wedge ring whereby a shoulder is formed abutting against the rear end of the ring, and having a reduced externally threaded inner end and the outer end fashioned to form a hand grip, the threads of both of said nuts being pitched in the same direction, and an internally threaded coupling sleeve engaging the reduced threaded sections of the coupling members, said coupling nuts and said sleeve being so shaped and arranged that the outer surfaces longitudinally of said members form a substantially uniform curved surface.

In testimony whereof I affix my signature in presence of two witnesses.

FRANK C. PAHLOW.

Witnesses:
 DWIGHT TRUE,
 CHARLES SHORT.